(12) United States Patent
Ashino et al.

(10) Patent No.: US 8,717,740 B2
(45) Date of Patent: May 6, 2014

(54) ELECTROLYTIC CAPACITOR

(75) Inventors: Hirotugu Ashino, Shinagawa-ku (JP);
Takashi Nochi, Shinagawa-ku (JP)

(73) Assignee: Nippon Chemi-Con Corporation, Tokyo (JP)

( * ) Notice: Subject to any disclaimer, the term of this patent is extended or adjusted under 35 U.S.C. 154(b) by 447 days.

(21) Appl. No.: 12/594,132

(22) PCT Filed: Dec. 14, 2007

(86) PCT No.: PCT/JP2007/074123
§ 371 (c)(1),
(2), (4) Date: Feb. 4, 2010

(87) PCT Pub. No.: WO2008/129729
PCT Pub. Date: Oct. 30, 2008

(65) Prior Publication Data
US 2012/0154984 A1    Jun. 21, 2012

(30) Foreign Application Priority Data

Mar. 30, 2007  (JP) .................................. 2007-093960

(51) Int. Cl.
*H01G 2/10* (2006.01)
*H01G 9/08* (2006.01)

(52) U.S. Cl.
USPC ............ 361/517; 361/511; 361/512; 361/535

(58) Field of Classification Search
None
See application file for complete search history.

(56) References Cited

U.S. PATENT DOCUMENTS

| 6,275,372 | B1 * | 8/2001 | Vassallo et al. | ............... 361/511 |
| 7,224,575 | B2 * | 5/2007 | Sherwood | ..................... 361/508 |

(Continued)

FOREIGN PATENT DOCUMENTS

| JP | 1022177 | | 1/1998 | |
| JP | 10022177 | * | 1/1998 | ............... H01G 9/06 |

(Continued)

OTHER PUBLICATIONS

Nippon Kondensa Kabushiki Kaisha, Microfilm of the specification and drawings annexed to the request of Japanese Utility Model Application No. 121219/1987 (Laid-open No. 26830/1989), Feb. 15, 1989.

(Continued)

*Primary Examiner* — Jayprakash N Gandhi
*Assistant Examiner* — Dion Ferguson
(74) *Attorney, Agent, or Firm* — George R. McGuire; Blaine T. Bettinger; Bond Schoeneck & King, PLLC (57) ABSTRACT

An electrolytic capacitor in which a capacitor element can be fixed firmly into a metal case without having adverse effects on the electrical characteristics of the electrolytic capacitor. An anode foil provided with an anode internal terminal and a cathode foil provided with a cathode internal terminal are wound or laminated through a separator to produce a capacitor element. The capacitor element is then contained in a metal case together with a driving electrolyte, and then the side surface of the metal case is caulked to press and fix the capacitor element, thus producing an electrolytic capacitor. The electrolytic capacitor is characterized in that a tape material is wound by a plurality of turns around the outer circumference of the capacitor element between the capacitor element and the caulking of the metal case such that a total thickness of the tape material is so large as to relax deformation of the capacitor element when the side surface of the metal case is caulked.

4 Claims, 7 Drawing Sheets

(56) References Cited

U.S. PATENT DOCUMENTS

| | | |
|---|---|---|
| 7,391,604 B2 * | 6/2008 | Yoshimitsu et al. .......... 361/523 |
| 7,706,129 B2 * | 4/2010 | Hirose et al. ................. 361/502 |

FOREIGN PATENT DOCUMENTS

| | | | |
|---|---|---|---|
| JP | 11186113 | 7/1999 | |
| JP | 2000124086 | 4/2000 | |
| WO | WO2007139008 | * 12/2007 | ............... H01G 9/00 |

OTHER PUBLICATIONS

Nippon Kondensa Kogya Kabushiki Kaisha, Microfilm of the specification and drawings annexed to the request of Japanese Utility Model Application No. 4244/1979 (Laid-open No. 105941/1980), Jul. 24, 1980.

Elna Co., Ltd., CD-ROM of the specification and drawings annexed to the request of Japanese Utility Model Application No. 42905/1991 (Laid-open No. 127635/1992), Nov. 20, 1992.

International Search Report Form PCT/ISA/210, International Application No. PCT/JP2007/074123, pp. 1-4, Dated Mar. 3, 2008.

* cited by examiner

4: sealing member

1: capacitor element

6: concave portion

2: winding stop tape

3: metal case

ELECTROLYTIC CAPACITOR

CROSS REFERENCE TO RELATED APPLICATION

The present application is the United States National Stage Application of PCT Application No. PCT/JP2007/074123, filed Dec. 14, 2007, by claiming the convention priority of Mar. 30, 2007, based upon Japanese Patent Application No. 2007-093960, filed Mar. 30, 2007. The entirety of PCT Application No. PCT/JP2007/074123 and Japanese Patent Application No. 2007-093960 are hereby incorporated by reference.

BACKGROUND OF THE INVENTION

The present invention is directed to an aluminum electrolytic capacitor.

Conventional aluminum electrolytic capacitor has a structure wherein an anode foil and a cathode foil are wound together or laminated by way of a separator such as an insulating paper to form a capacitor element, wherein the anode foil has an etching foil consisting of a valve action metal such as aluminum and has a chemical film formed on the etching foil, and wherein the cathode foil consists of an etching foil made of a valve action metal such as aluminum. The capacitor element is impregnated with driving electrolyte, and is then housed into a metal case having a bottomed tubular shape, wherein the aperture of the metal case is sealed with a sealing member, and thereby an electrolytic capacitor is configured.

With respect to these types of electrolytic capacitors, a suggested conventional method for fixing a capacitor element within a metal case is that a fixing agent such as a thermoplastic resin and an epoxy resin is filled within a metal case such that a capacitor element is fixed within the metal case.

Figure 7:
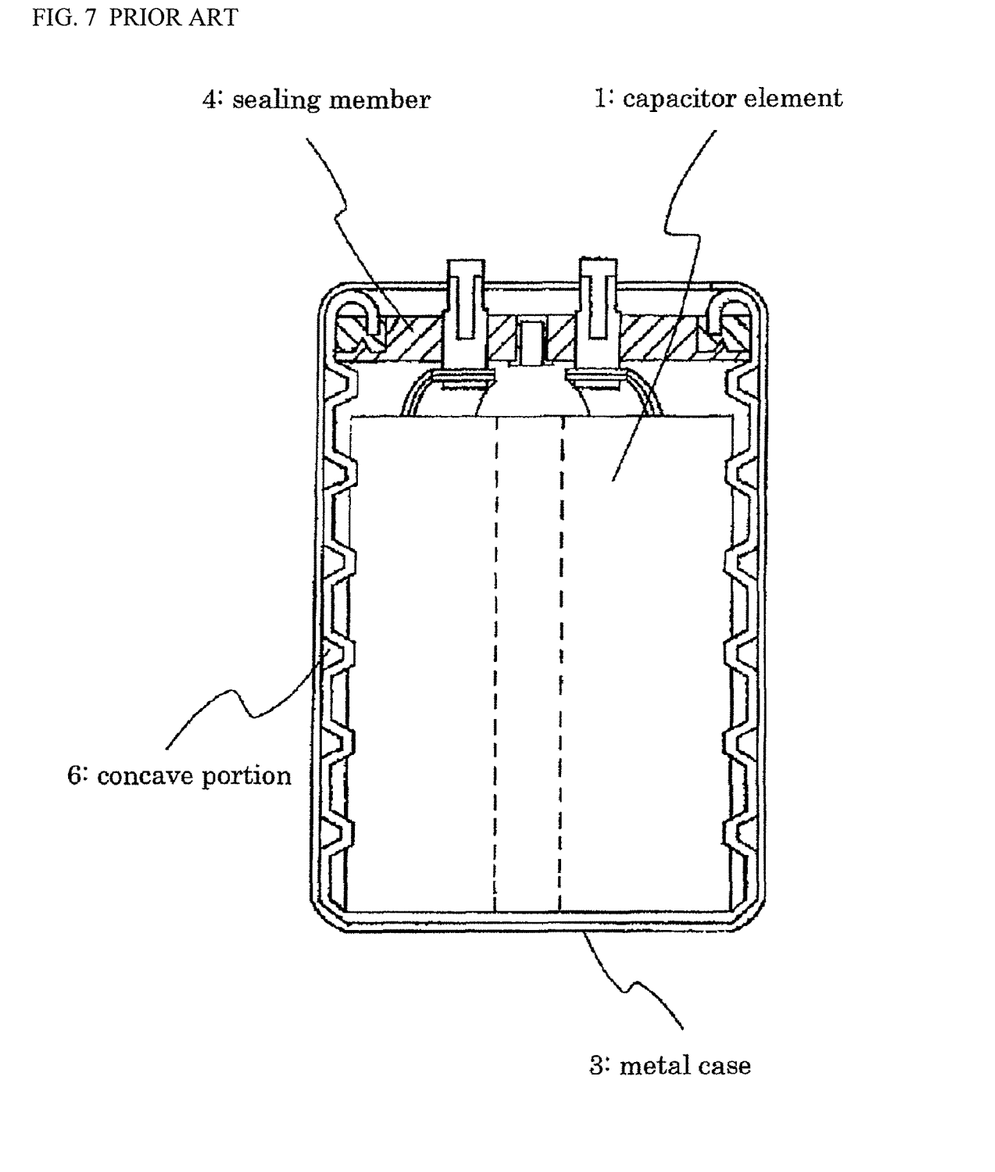
FIG. 7 is a cross-sectional view that illustrates a conventional aluminum electrolytic capacitor.

Further, as shown in FIG. 7, the Patent Document 1 (Japanese Laid-open Patent Publication No. 2000-30981) discloses an invention wherein a side surface of a metal case 2 is caulked to form a convex portion 6; and by means of the convex portion 6, a capacitor element 1 is pressed at the outer circumference surface of the capacitor element 1 such that the capacitor element 1 is fixed within the metal case 2 (Patent Document 1).

Meanwhile, in recent years, an electrolytic capacitor tends to be for use in cars. When used in cars, the capacitor sustains continuous violent vibration. The vibration stress applied to the electrolytic capacitor is greater than several tens G, and is required to have a vibration resistance of $10^6$ to $10^8$ times or greater, which is the fatigue limit of general metals. Hence, firm fixation of a capacitor element within a metal case is necessary.

In case of conventional fixation of a capacitor element using fixation agent, firm fixation of a capacitor element requires greater amount of fixation agent to be filled within a metal case, leading to smaller space within the metal case, which is an admissible space for increased internal pressure during use of an electrolytic capacitor. Hence, a safety device such as a pressure valve is more likely to operate, resulting in shorter lifetime of the electrolytic capacitor, which is problematic.

Further, as shown in FIG. 7, when the side surface of the metal case 3 is caulked to fix the capacitor element 1, firm fixation of the capacitor element 1 requires greater suppress strength against the capacitor element 1 achieved by providing a larger convex portion 6 which is formed when the side surface of the metal case 3 is caulked. Mechanical stress is applied to the electrode foil that forms the capacitor element 1, resulting in adverse effects to some electric properties such as leakage of current.

The present invention is proposed to solve the aforementioned problems of the conventional techniques, and it is thus an object of the present invention, among others, to provide with an electrolytic capacitor that allows for firm fixation of a capacitor element within a metal case without giving any adverse effects to the electric properties of the electrolytic capacitor.

SUMMARY OF THE INVENTION

The electrolytic capacitor according to an embodiment of the present invention that solves the above-described problems generally comprises: an anode foil having an anode internal terminal and a cathode foil having a cathode internal terminal are wound together or laminated by way of a separator to form a capacitor element; the capacitor element is housed into a metal case together with driving electrolyte; a side surface of the metal case is caulked to press and fix the capacitor element, wherein a tape material is wound by a plurality of turns around the outer circumference of the capacitor element between the capacitor element and the caulking of the metal case such that a total thickness of the tape material is so large as to relax deformation of the capacitor element when the side surface of the metal case is caulked.

According to this embodiment, a tape material is wound by a plurality of turns around the outer circumference of the capacitor element such that a total thickness of the tape material is so large as to relax deformation of the capacitor element when the side surface of the metal case is caulked. Hence, even if the caulking depth is greater in order to ensure firm fixation of the capacitor element, the stress applied to the capacitor element is relaxed by the tape material, and firm fixation of the capacitor element within the metal case can be ensured without involving any degradation of the electric properties of the electrolytic capacitor.

In addition, the tape material can be easily attached by way of winding and arranging around the outer circumference of the capacitor element, in contrast to the conventional way of controlling by use of the fill ration and so on of the fixative. Change in the number of turns of the tape material that is wound around the outer circumference of the capacitor element enables one to easily form the wound tape material such that the tape material has a desired total thickness, without any regard to the size of the clearance between the capacitor element and the metal case. For this tape material, a winding stop tape can be used that stops the capacitor element. In addition, examples of the material include polyphenylene sulfide, polyethylene terephthalate, polypropylene, ethylene propylene terpoleymer, and polyethylene naphthalate.

Besides, the tape material is wound by a plurality of turns, a thickness thereof being 200 to 600 μm, and thus, even with greater caulking size on the side of the metal case, the capacitor element can be fixed with the mechanical stress applied to the capacitor element being reduced. Hence, the capacitor element can sustain the vibration stress of several tens G or greater applied during car use.

Further, caulking of the side surface of the metal case rendered at a plurality of portions allows for more firm fixation of the capacitor element within the metal case.

The cathode foil is preferably wound along the outermost circumference of the capacitor element and is wound shorter than the winding end of the anode foil. This is based on the finding of the present inventors et al. that during caulking of the side surface of the metal case, a short circuit is likely to occur between the winding end of the anode foil and the cathode foil facing therewith. Hence, the cathode foil is wound shorter than the anode foil such that the side of the capacitor element outer circumference of the cathode foil corresponding to the winding end of the anode foil does not face with the anode foil, resulting in reduction of the probability of a short circuit.

Suppose that the cut burr formed at a winding end of the anode foil is made to face in a direction of a capacitor element outer circumference. The cathode foil is wound shorter than the winding end of the anode foil on the side of the capacitor element outer circumference. Hence, there is no cathode foil facing the winding end of the anode foil on the side of the capacitor element outer circumference, whereby a short circuit is prevented.

Further, if an insulation sheet is disposed between the winding end of the anode foil and the cathode foil facing therewith, short circuit is reliably prevented.

According to the present invention, the capacitor element is thinly fixed to within the metal case without giving any adverse effects to the electric properties of the electrolytic capacitor.

EXPLANATION OF LETTERS OR NUMERALS 1 capacitor element
2 winding stop tape
3 metal case
4 sealing member
5 curling means
6 convex portion
7 cathode foil
8 anode foil
9 separator
10 tape material
11 winding end
12 burr
13 lead terminals

DETAILED DESCRIPTION

A detailed explanation of the embodiments will be given with reference to the drawings.

Figure 1:
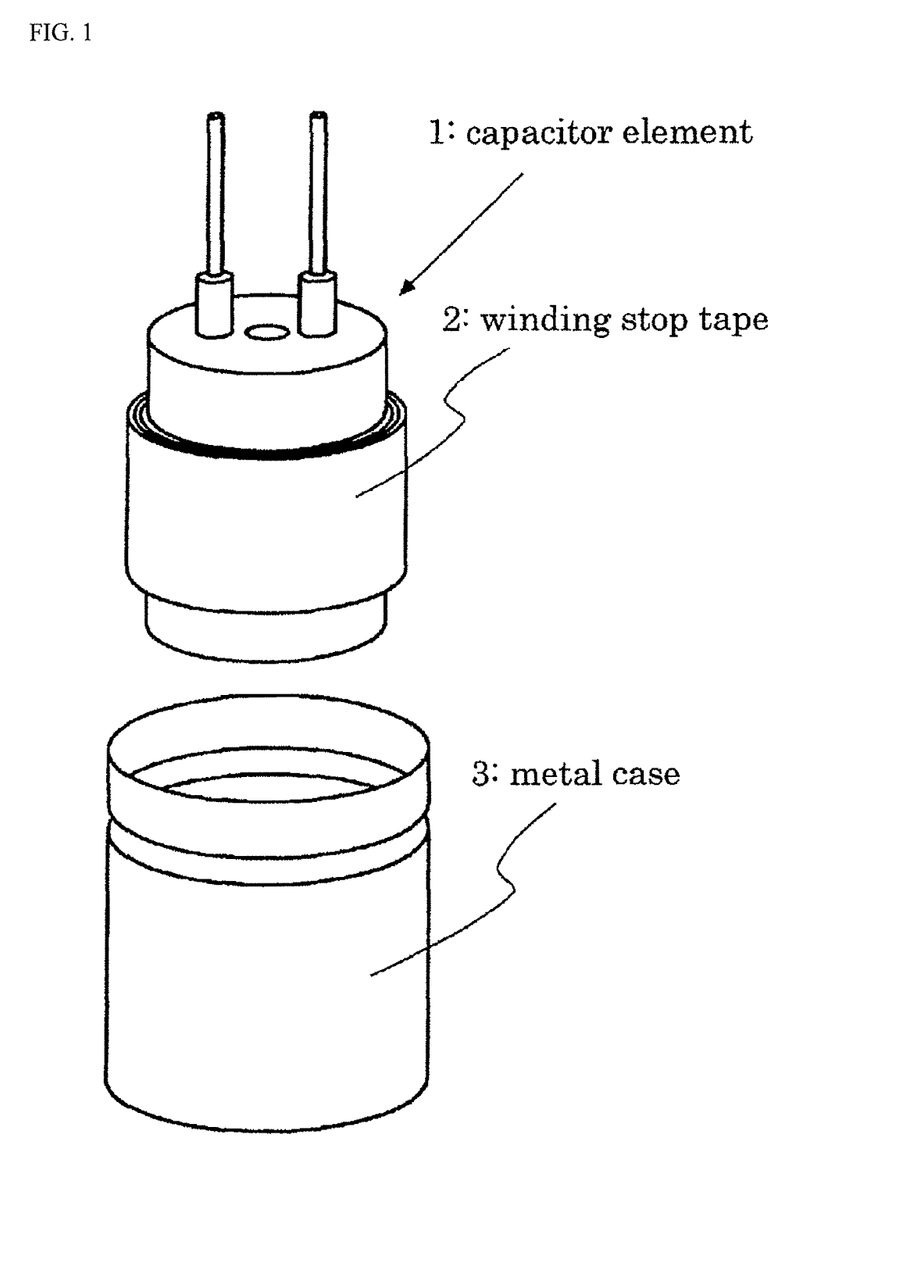
FIG. 1 is a perspective view that illustrates the fabrication process of the electrolytic capacitor according to the embodiment of the present invention.

FIG. 1 is a perspective view that illustrates the fabrication process of the electrolytic capacitor according to the embodiment of the present invention.

Figure 2:
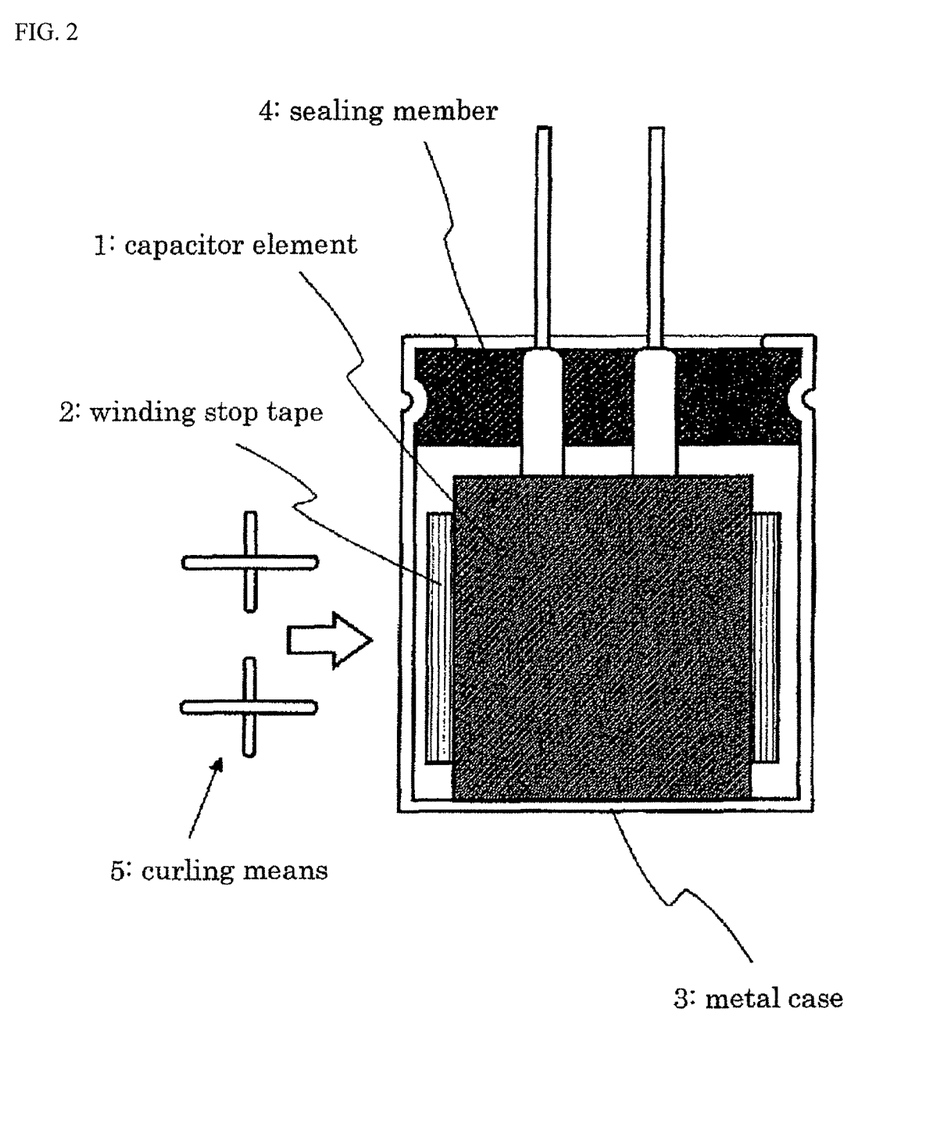
FIG. 2 is a cross-sectional view that illustrates the fabrication process of the electrolytic capacitor according to the embodiment of the present invention.

FIG. 2 is a cross-sectional view that illustrates the fabrication process of the electrolytic capacitor according to the embodiment of the present invention.

Figure 3:
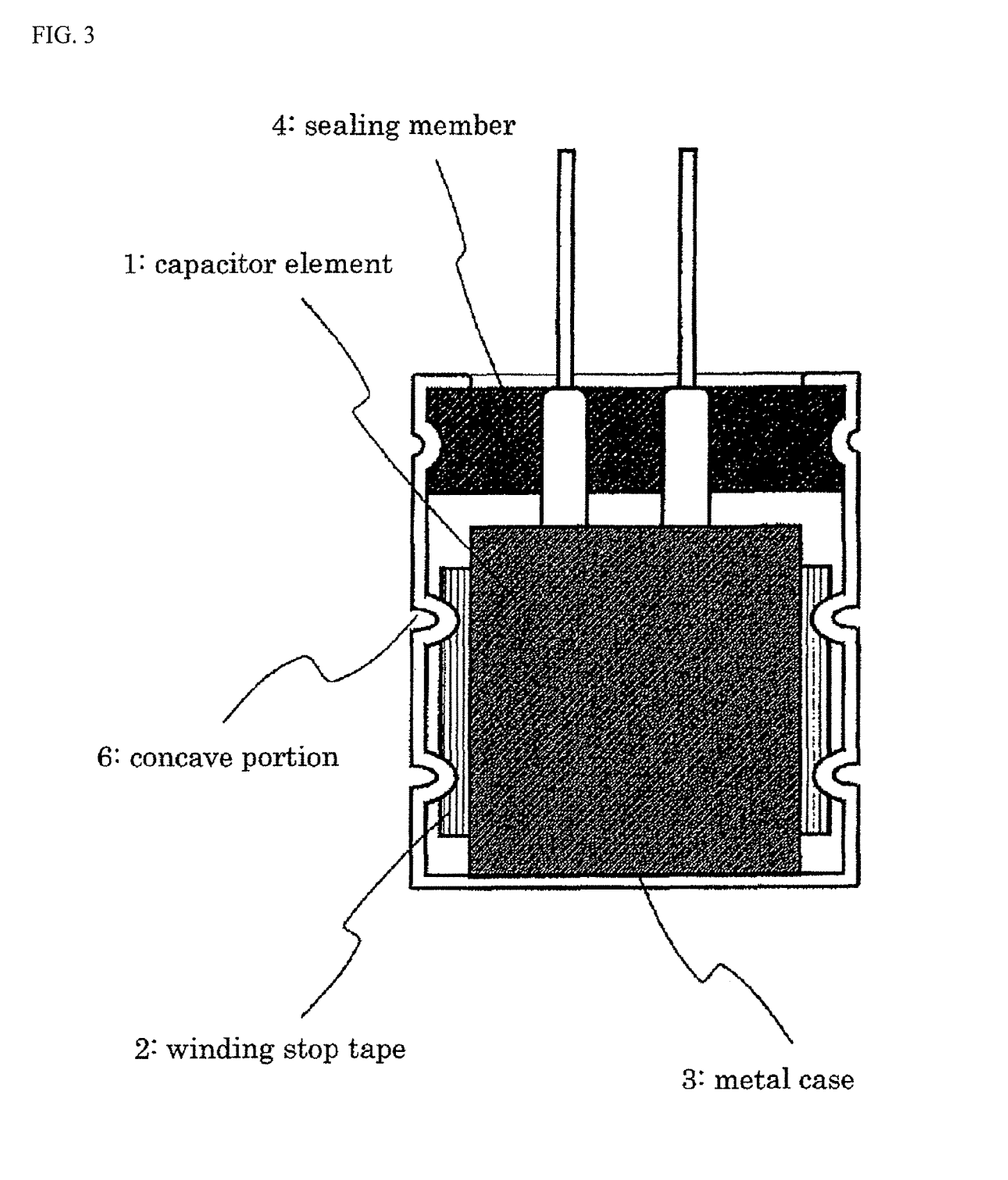
FIG. 3 is a cross-sectional view that illustrates the fabrication process of the electrolytic capacitor according to the embodiment of the present invention.

FIG. 3 is a cross-sectional view that illustrates the fabrication process of the electrolytic capacitor according to the embodiment of the present invention.

As shown in FIG. 1, in the electrolytic capacitor according to the present embodiment, the anode foil comprises an aluminum foil that is etched to have a chemical formed coating, while the cathode foil comprises an aluminum foil that is etched to optionally have a chemical formed coating. To each of these two electrode foils is connected an electrode internal terminal by way of the stitching and cold welding methods, where embodiments of the electrode internal terminal include an internal tab terminal made of aluminum and the like and having an elongated foil shape, and a lead terminal comprising a round bar section, a flattened section and a lead section being connected to the round bar section. The anode foil, the cathode foil and a separator placed there between are wound or laminated to form a capacitor element 1 by fixing a winding end and a layered end using a winding stop tape 2, where the separator is made of an insulating member such as insulating paper like Manila paper and kraft paper, nonwoven cloth, and mixed paper thereof. The capacitor element 1 is housed into a metal case 3 made of aluminum having a bottomed tubular shape together with driving electrolyte; a sealing member 4 comprising elastic rubber is arranged at an open end of the metal case 3; and the open end is caulked by way of a curling process such that the electrolytic capacitor is encapsulated.

Now the winding stop tape 2 of the capacitor element 1 will be described in detail. The winding stop tape 2 is wound by a plurality of turns around the outer circumference of the capacitor element 1 such that the wound tape has a predetermined thickness. The total thickness of the winding stop tape 2 is within the range between 200 and 600 um, which is great enough to relax the stress applied to the capacitor element 1 when the side surface of the metal case 3 described below is caulked to form a convex portion 6. It is particularly preferred that the thickness is 300 to 500 pm. As the caulking depth size increases, the stress caused by the convex portion 6 which is formed by caulking the side surface of the metal case 3 described below becomes greater. If the caulking depth is made to accept the vibrations of several tens G or greater applied to the capacitor element 1 for car use, the above-described total thickness of the winding stop tape 2 is essentially demanded in order to relax the stress against the capacitor element 1 such that the capacitor element 1 will not suffer from degradation of the electric properties of the electrode foil caused by the convex portion 6. In the present embodiment, polyphenylene sulfide of about 50 um thick is employed as the winding stop tape 2, which is wound by 4 to 12 turns.

In the present embodiment, a winding stop tape 2 is employed as a tape material, the examples of which material can include resin tape made of polyphenylene sulfide, polyethylene terephthalate, polypropylene, ethylene propylene terpoleymer, polyethylene naphthalate and the like; rubber tape; and insulative electrolytic paper. Employing the winding stop tape 2 for the tape material, conventional equipment can be utilized, resulting in simpler fabrication processes. In addition, the tape material is wound around the outer circumference of the capacitor element 1 such that the wound tape is adhered to the capacitor element 1 to make a stronger relaxation member. Change in the number of turns of the tape material that is wound around the outer circumference of the capacitor element 1 by means of the clearance between the capacitor element 1 and the metal case 3 allows for easy change in the total thickness of the tape material. Hence, it is possible to easily form the wound tape material such that the tape material has a desired total thickness, without any regard to the size of the clearance between the capacitor element 1 and the metal case 3.

Next, the electrolytic capacitor made in the above-described manner is caulked by means of the curling means 5 from the side surface of the metal case 3. The curling means 5 is intruded from the side surface of the metal case 3 to press the winding stop tape 2 wound around the above-described capacitor element 1, and the inside surface of the metal case 3 is deformed to have a convex shape. The convex portion 6 breaks into the winding stop tape 2 that relaxes the stress caused by the convex portion 6 such that the capacitor element 1 is fixed. The capacitor element 1 can be more firmly fixed when the curling means 5 is intruded into the upper and lower portions of the electrolytic capacitor. The curling means 5 is provided with a sensor that measures the caulking pressure (not shown), which sensor measures the pressure at the time of caulking of the metal case 3 of the curling means 5. This enables one to comprehend the status of fixation of the capacitor element 1 achieved by the convex portion 6 formed inside the metal case 3, and thereby to control whether the caulking is to be continued or discontinued.

As described above, winding a tape material by a plurality of turns around the outer circumference of the capacitor element 1 allows for relaxation, by means of the tape material, of the stress applied to the capacitor element 1 when the side surface of the metal case 3 is caulked, whereby the caulking size of the side surface of the metal case 3 can be made large enough to achieve satisfiable vibration resistance required for car use.

Figure 4:
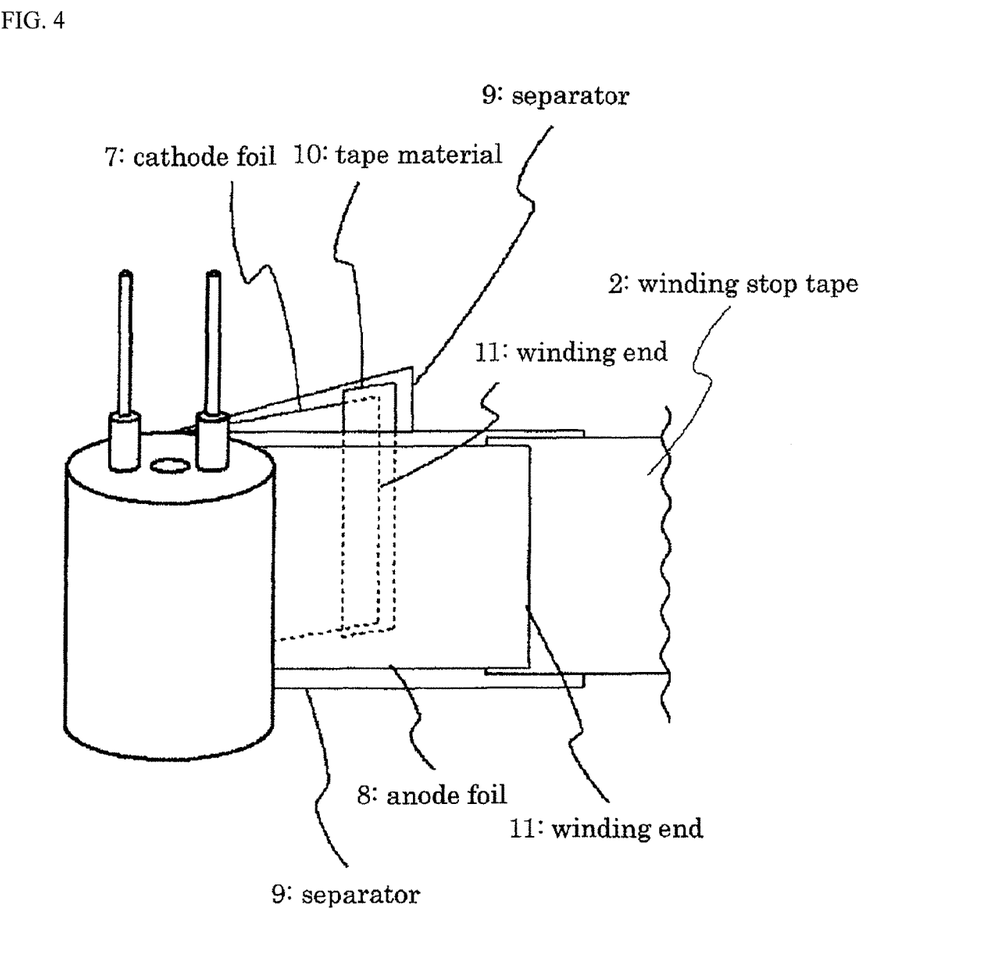
FIG. 4 is a perspective view that illustrates the electrolytic capacitor according to the alternative embodiment the present invention.
Figure 5:
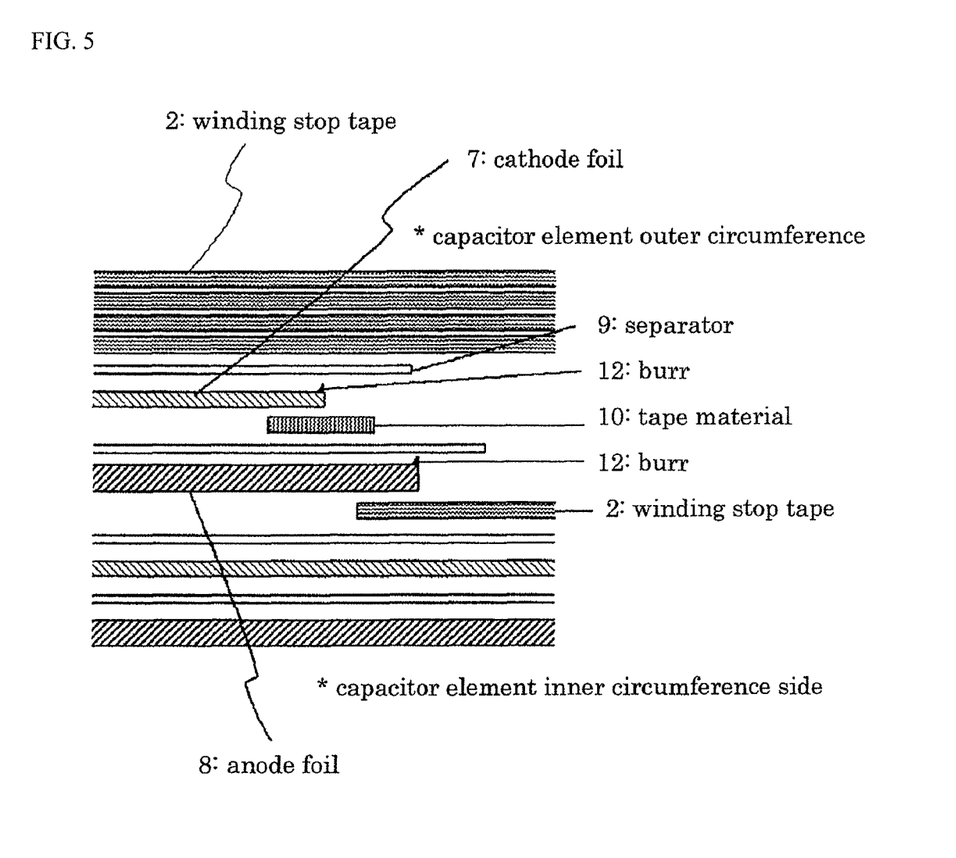
FIG. 5 is a cross-sectional view that illustrates the electrolytic capacitor according to the alternative embodiment the present invention.

Next, an alternative embodiment of the embodiment according to the present invention will be described in detail with reference to the drawings. FIG. 4 is a perspective view that illustrates the capacitor element of the alternative embodiment according to the present invention. FIG. 5 is a cross-sectional view that illustrates a winding structure of the capacitor element of the alternative embodiment according to the present invention.

First, the present alternative embodiment describes in detail the winding structure of the capacitor element of the aforedescribed embodiment. As shown in FIG. 4, the capacitor element is wound by an anode foil 8, a cathode foil 7 and a separator 9 placed therebetween. An insulative tape material 10 is disposed along the capacitor element inner circumference side of the winding end 11 of the cathode foil 7. Besides, an insulative tape material 10 is also disposed along the capacitor element inner circumference side of the winding end 11 of the anode foil 8. The tape material 10 provided on the anode foil also functions as a winding stop tape 2 that stops the capacitor element in consideration of the enhanced productivity, and the tape material 20 stops the winding after a plurality of turns around the outer circumference of the capacitor element. The tape material 10 is similar to the one shown in the embodiment.

Next, FIG. 5 shows the vicinity of the winding end 11 of the anode and cathode foils 8 and 7 of the capacitor element, where the anode and cathode foils 8 and 7 are wound around the capacitor element in such a manner that the cathode foil 7 is arranged outward relative to the anode foil 8 and that the cathode foil 7 is wound shorter than the anode foil 8. In other words, as shown in FIG. 5, the winding end 11 of the anode foil 8 is configured not to face with the capacitor element outer circumference side of the cathode foil 7.

Here, the inventors et al. of the present application studied the portion where a short circuit is likely to occur when the side surface of the metal case is caulked, and found that the anode foil 8, having greater hardness than the cathode foil 7, tends to sustain concentrated stress during caulking, and that thereby a short circuit is likely to occur between the winding end 11 of the anode foil 8 and the cathode foil 7 facing therewith. Thus, as described above, the cathode foil is wound shorter than the anode foil such that the capacitor element outer circumference side of the cathode foil corresponding to the winding end of the anode foil does not face with the anode foil, resulting in reduction of a short circuit.

Accordingly, when housed in a metal case and caulked by the side surface of the metal case, a short circuit generated at the winding end 11 of the anode 8 is toward the cathode foil 7 facing with the capacitor element inner circumference side of the winding end 11 of the anode foil 8. As described above, a tape material 10 that also functions as a winding stop tape 2 disposed only on this portion avoids a short circuit. On the contrary, the cathode foil 7 can be wound longer than the anode foil 8. In this case, the capacitor inner and outer circumference sides of the winding end 11 of the anode foil 8 faces with the cathode foil 7, and a tape material 10 should thus be disposed on both sides of the anode foil 8, which is troublesome.

In addition, as shown in FIG. 5, the anode foil 8 is arranged in such a manner that at the winding end 11 of the anode foil 8, the cut burr 12 that is generated thereon when the anode foil 8 is severed faces the capacitor element outer circumference side. According to this, the cut burr 12 of the winding end 11 of the anode foil 8 does not face with the cathode foil 7, whereby a short circuit by the burr 12 is less likely to occur. The same applies to the cut burr 12 on the winding end 11 of the cathode foil 7. The cut burr 12 is arranged to face the capacitor element outer circumference side, thus preventing a short circuit caused by the contact between the cathode and anode foils 7 and 8 by way of the cut burr 12.

Figure 6:
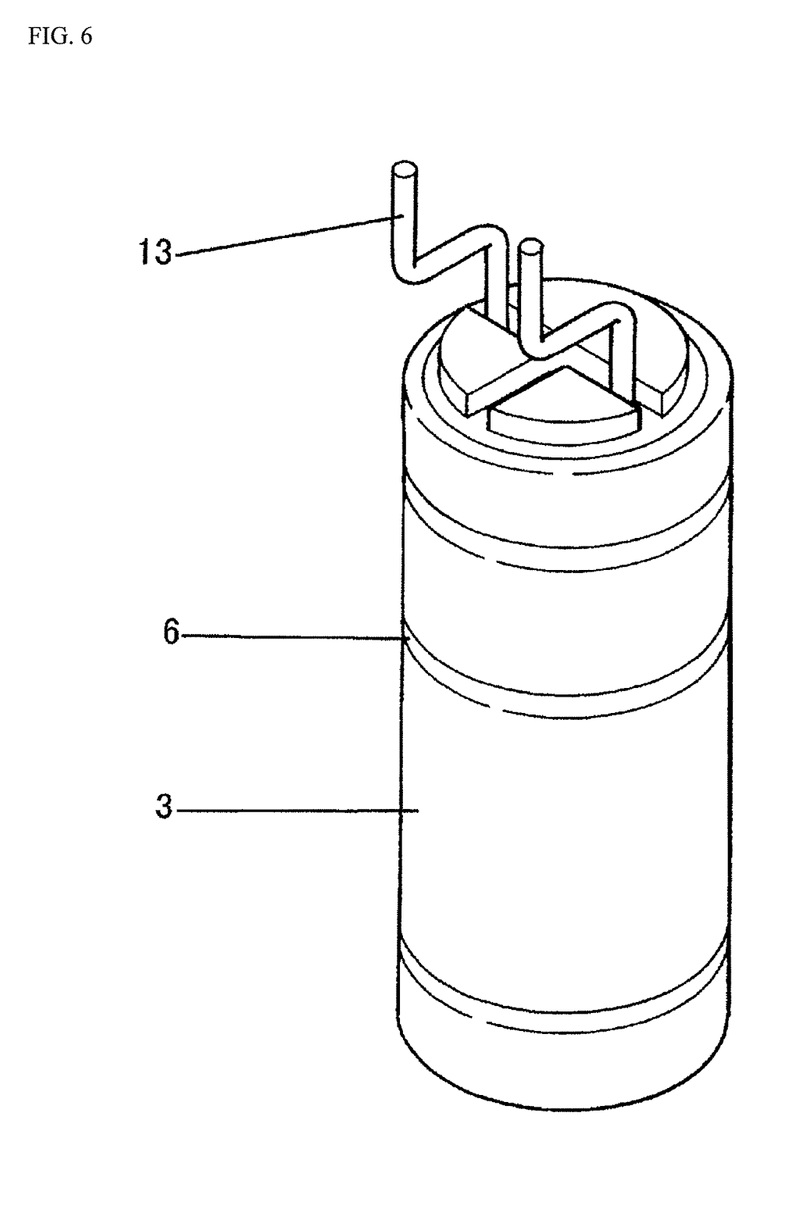
FIG. 6 is a perspective view that illustrates the electrolytic capacitor according to the alternative embodiment the present invention.

As shown in FIG. 6, in the capacitor according to the present invention, a bending work is preferably conducted to have a crank shape at the central portion of each one of the cathode and anode lead terminals 13, as a countermeasure for preventing the cathode foil and so on inside the capacitor case from directly suffering the external force in the cylindrical axis direction of the capacitor case.

Although the embodiments of the present invention has been described with reference to the drawings, the specific configuration is not limited to these embodiments, and the changes or additions which do not part from the spirit of the invention are included in the present invention. For example, in the embodiments, caulking of the side surface of the metal case 3 is conducted at two portions of the upper and lower ends thereof; however, the invention is not limited to this: the caulking can be rendered at the central portion or at three or more portions of the side surface of the metal case 3.

Further, the tape material is used as a winding stop tape 2; however, the invention is not limited to this: each of the tape material and the winding stop tape 2 can be configured as a different member.

What is claimed is:

1. An electrolytic capacitor, comprising:
an anode foil having an anode internal terminal and a cathode foil having a cathode internal terminal are joined by way of a separator to form a capacitor element, wherein a winding end of the cathode foil is wound shorter than a winding end of the anode foil at the outermost circumference of the capacitor element, and further wherein cut burrs formed at the winding ends of the anode and the cathode foils are placed in a direction facing a capacitor element's outer circumference;
a driving electrolyte;
a metal case having a die surface and housing the driving electrolyte and the capacitor element; and
a side surface of the metal case is swaged to create a concave portion that presses inward against a tape material wound around the outer circumference of the capacitor element, in order to press and fix the capacitor element in place inside the metal case;
wherein the tape material is a winding stop tape that stops the capacitor element, and is wound by a plurality of turns around the outer circumference of the capacitor element between the capacitor element and the caulking of the metal case such that a total thickness of the tape material is approximately 200 to 600 μm so as to relax deformation of the capacitor element when the side surface of the metal case is swaged.

2. The electrolytic capacitor of claim 1, wherein the metal case includes a side surface and is swaged at a plurality of portions of a side surface thereof.

3. The electrolytic capacitor as claimed in claim 1, wherein an insulation sheet is disposed between the winding end of the anode foil and the cathode foil facing therewith.

4. The electrolytic capacitor of claim 1, further comprising a lead terminal connected to the anode foil internal terminal and the cathode foil internal terminal, respectively, and being bent in a crank shape outside the metal case and in an axial direction of the metal case.

* * * * *